US012580771B2

(12) United States Patent　　(10) Patent No.:　　US 12,580,771 B2
Sakurada　　　　　　　　　　　(45) Date of Patent:　　　Mar. 17, 2026

(54) INFORMATION PROCESSING APPARATUS, INFORMATION PROCESSING METHOD, AND STORAGE MEDIUM

(71) Applicant: Daiki Sakurada, Kanagawa (JP)

(72) Inventor: Daiki Sakurada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 101 days.

(21) Appl. No.: 18/407,649

(22) Filed: Jan. 9, 2024

(65) Prior Publication Data

US 2024/0259211 A1　　Aug. 1, 2024

(30) Foreign Application Priority Data

Jan. 27, 2023　　(JP) ................................. 2023-011083

(51) Int. Cl.
H04L 9/08　　　　(2006.01)
H04L 9/32　　　　(2006.01)

(52) U.S. Cl.
CPC .......... H04L 9/3242 (2013.01); H04L 9/0894 (2013.01)

(58) Field of Classification Search
CPC . H04L 9/3236; H04L 9/03242; H04L 9/0891; H04L 9/0894
USPC .................................................. 713/193–194
See application file for complete search history.

(56) References Cited

U.S. PATENT DOCUMENTS

| | | | | |
|---|---|---|---|---|
| 7,224,804 B2 * | 5/2007 | Ishiguro | ................ | H04L 9/0891 380/279 |
| 8,908,860 B2 * | 12/2014 | Kobayashi | ............ | H04L 9/3239 380/28 |
| 2002/0169972 A1 * | 11/2002 | Tanaka | ............. | G11B 20/00855 713/193 |
| 2011/0173460 A1 * | 7/2011 | Ito | ......................... | H04L 9/0836 713/193 |
| 2019/0095138 A1 | 3/2019 | Sakurada et al. | | |
| 2021/0144014 A1 | 5/2021 | Sakurada | | |
| 2021/0350027 A1 | 11/2021 | Sakurada | | |
| 2023/0177163 A1 | 6/2023 | Sakurada | | |
| 2025/0132902 A1 * | 4/2025 | Hasegawa | ............. | H04L 9/0897 |

FOREIGN PATENT DOCUMENTS

| | | |
|---|---|---|
| JP | 2008-234079 A | 10/2008 |
| JP | 2013-041626 A | 2/2013 |
| JP | 2015-055956 A | 3/2015 |

* cited by examiner

*Primary Examiner* — Bharat Barot

(74) *Attorney, Agent, or Firm* — IPUSA, PLLC

(57)　　　　　　ABSTRACT

An information processing apparatus includes processing circuitry. The processing circuitry writes an encryption key file that is encrypted into a second storage. The encryption key file includes first encryption key data and a first hash value of the first encryption key data. The first encryption key data is used for decrypting data stored in a first storage. The processing circuitry decrypts the encryption key file that is encrypted using a second encryption key data to obtain the encryption key file that is decrypted. The processing circuitry calculates a second hash value from the first encryption key data included in the encryption key file that is decrypted. The processing circuitry performs verification of the second encryption key data based on a determination of whether the first hash value matches the second hash value. The processing circuitry notify a verification result when the verification fails.

7 Claims, 10 Drawing Sheets

FIG. 5

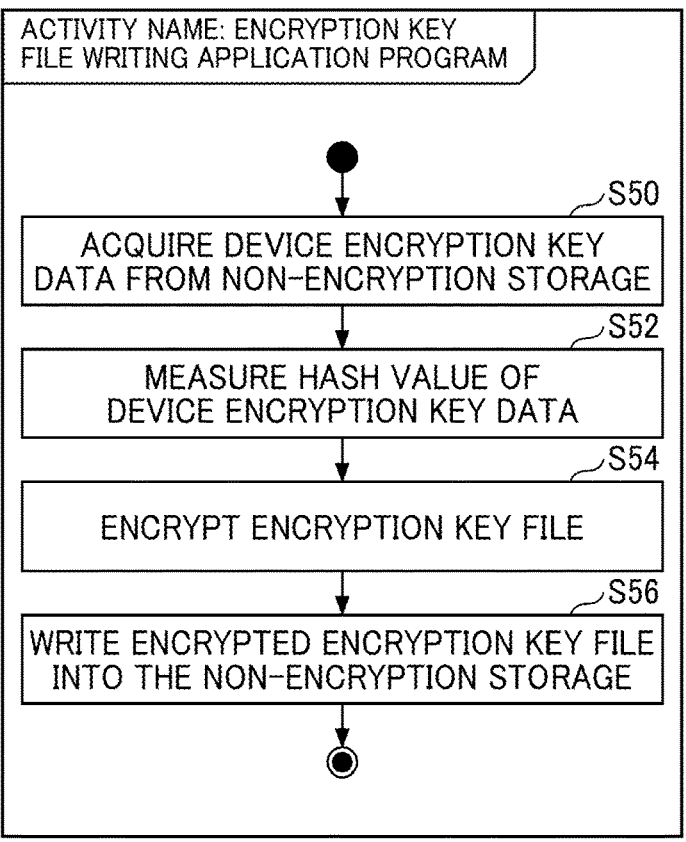

ACTIVITY NAME: ENCRYPTION KEY
FILE WRITING APPLICATION PROGRAM

S50
ACQUIRE DEVICE ENCRYPTION KEY
DATA FROM NON-ENCRYPTION STORAGE

S52
MEASURE HASH VALUE OF
DEVICE ENCRYPTION KEY DATA

S54
ENCRYPT ENCRYPTION KEY FILE

S56
WRITE ENCRYPTED ENCRYPTION KEY FILE
INTO THE NON-ENCRYPTION STORAGE

FIG. 6

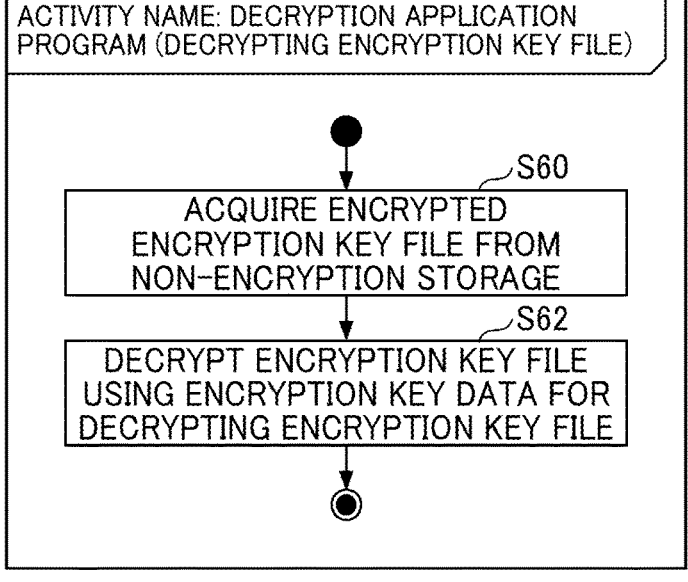

ACTIVITY NAME: DECRYPTION APPLICATION
PROGRAM (DECRYPTING ENCRYPTION KEY FILE)

S60
ACQUIRE ENCRYPTED
ENCRYPTION KEY FILE FROM
NON-ENCRYPTION STORAGE

S62
DECRYPT ENCRYPTION KEY FILE
USING ENCRYPTION KEY DATA FOR
DECRYPTING ENCRYPTION KEY FILE

INFORMATION PROCESSING APPARATUS, INFORMATION PROCESSING METHOD, AND STORAGE MEDIUM

CROSS-REFERENCE TO RELATED APPLICATION

This patent application is based on and claims priority pursuant to 35 U.S.C. § 119(a) to Japanese Patent Application No. 2023-011083, filed on Jan. 27, 2023, in the Japan Patent Office, the entire disclosure of which is hereby incorporated by reference herein.

BACKGROUND

Technical Field

Embodiments of the present disclosure relate to an information processing apparatus, an information processing method, and a storage medium.

Related Art

Currently, in an information processing apparatus, a technique is known in which unauthorized tampering with a file (e.g., firmware and software) constituting a system is detected, and only a valid file is allowed to be executed to ensure the integrity and authenticity of the file. In the technique for detecting unauthorized tampering with the file constituting a system, authentication data such as an expected value of a hash value (measured value) or an electronic signature is stored in advance in a target file, and is compared and verified with the expected value or the electronic signature to confirm the integrity and authenticity of the file on a file-by-file basis.

A technique is known that notifies highly reliable information of the validity of activated software.

SUMMARY

Embodiments of the present disclosure described herein provide a novel information processing apparatus including processing circuitry. The processing circuitry writes an encryption key file that is encrypted into a second storage. The encryption key file includes first encryption key data and a first hash value of the first encryption key data. The first encryption key data is used for decrypting data stored in a first storage. The processing circuitry decrypts the encryption key file that is encrypted using a second encryption key data to obtain the encryption key file that is decrypted. The processing circuitry calculates a second hash value from the first encryption key data included in the encryption key file that is decrypted. The processing circuitry performs verification of the second encryption key data based on a determination of whether the first hash value matches the second hash value. The processing circuitry notify a verification result when the verification fails.

Embodiments of the present disclosure described herein provide a novel information processing method. The method includes: writing an encryption key file that is encrypted into a second storage, the encryption key file including first encryption key data and a first hash value of the first encryption key data, the first encryption key data being used for decrypting data stored in a first storage; decrypting the encryption key file that is encrypted using a second encryption key data to obtain the encryption key file that is decrypted; calculating a second hash value from the first encryption key data included in the encryption key file that is decrypted; performing verification of the second encryption key data based on a determination of whether the first hash value matches the second hash value; and notifying a verification result when the verification fails.

Embodiments of the present disclosure described herein provide a novel non-transitory, computer-readable storage medium storing computer-readable program code that causes an information processing apparatus to perform: writing an encryption key file that is encrypted into a second storage, the encryption key file including first encryption key data and a first hash value of the first encryption key data, the first encryption key data being used for decrypting data stored in a first storage; decrypting the encryption key file that is encrypted using a second encryption key data to obtain the encryption key file that is decrypted; calculating a second hash value from the first encryption key data included in the encryption key file that is decrypted; performing verification of the second encryption key data based on a determination of whether the first hash value matches the second hash value; and notifying a verification result when the verification fails.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a flowchart of a process of an encryption key file writing application program, according to an embodiment of the present disclosure;

FIG. 6 is a flowchart of a process of a decryption application program for decrypting an encryption key file, according to an embodiment of the present disclosure;

FIG. 10 is a block diagram illustrating a hardware configuration of a personal computer (PC) according to an embodiment of the present disclosure; and FIG. 11 is a block diagram illustrating a hardware configuration of a multifunctional peripheral, product or printer (MFP), according to an embodiment of the present disclosure.

Figure 1:
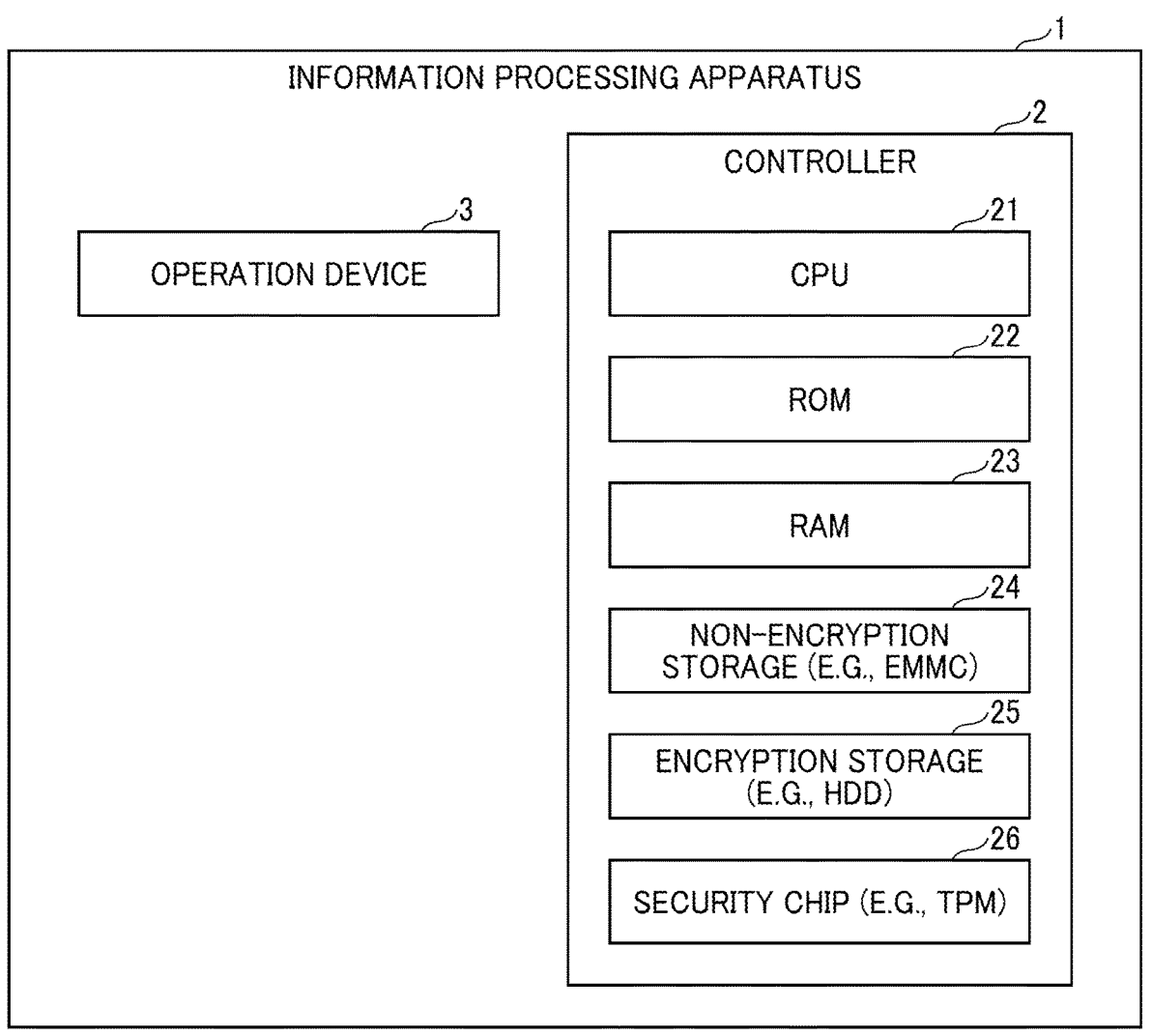
FIG. 1 is a block diagram illustrating a hardware configuration of an information processing apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, a description is given below of embodiments of the present disclosure. Like reference signs denote like elements as much as possible and overlapping description may be omitted as appropriate to facilitate understanding of the description.

First Embodiment

FIG. 1 is a block diagram illustrating a hardware configuration of an information processing apparatus according to an embodiment of the present disclosure. An information processing apparatus 1 of FIG. 1 includes a controller 2 and an operation device 3. The controller 2 controls overall operations of the information processing apparatus 1.

The controller 2 includes a central processing unit (CPU) 21, a read-only memory (ROM) 22, a random-access memory (RAM) 23, a non-encryption storage 24, an encryption storage 25, and a security chip 26. The CPU 21 controls the overall operations of the information processing apparatus 1. The ROM 22 stores a program such as an initial program loader (IPL) to boot the CPU 21. The RAM 23 is used as a work area for the CPU 21.

The non-encryption storage 24 stores files (e.g., firmware and software) constituting a system and an encryption key file described below. The non-encryption storage 24 is, for example, an embedded multimedia card (eMMC). The encryption storage 25 stores encrypted data. The encrypted data is, for example, data such as an address book, a log, or setting values of a device used by an application program. The encryption storage 25 is, for example, a hard disk drive (HDD).

The security chip 26 is used to verify the integrity and authenticity of the firmware when the system boots up. The security chip 26 is, for example, a trusted platform module (TPM). The operation device 3 includes an input device and an output device. The input device of the operation device 3 receives an operation of a user, and may be implemented by a touch panel. The output device of the operation device 3 performs output such as display, and may be implemented by a liquid crystal display.

Figure 2:
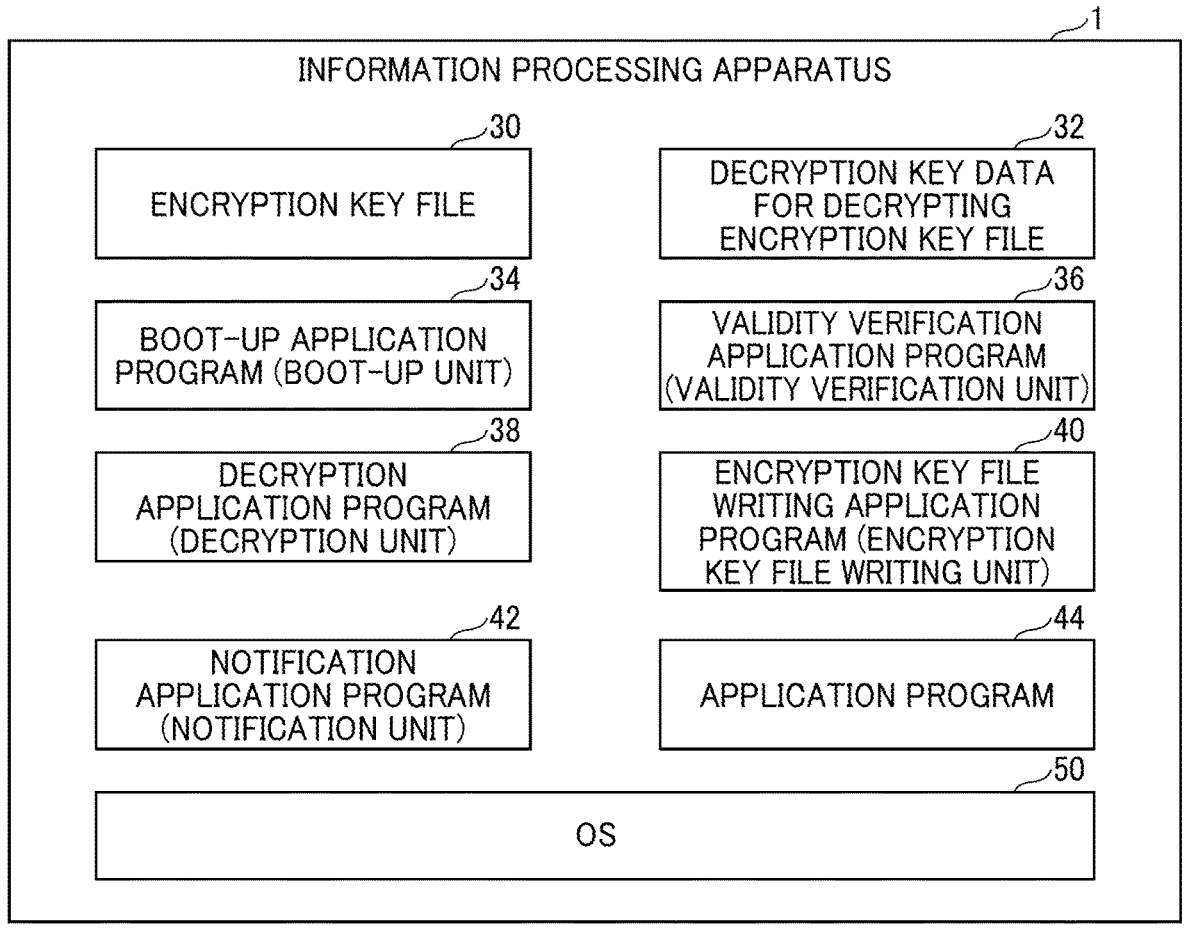
FIG. 2 is a block diagram illustrating a software configuration of the information processing apparatus of FIG. 1 according to an embodiment of the present disclosure.

FIG. 2 is a block diagram illustrating a software configuration of the information processing apparatus 1 according to an embodiment of the present disclosure. The information processing apparatus 1 illustrated in FIG. 2 includes an encryption key file 30, a decryption key data 32 for decrypting encryption key file, a boot-up application program 34, a validity verification application program 36, a decryption application program 38, an encryption key file writing application program 40, a notification application program 42, an application program 44, and an operating system (OS) 50.

The OS 50 of the information processing apparatus 1 illustrated in FIG. 2 is an operating system. The OS 50 controls the overall operations of the information processing apparatus 1. The encryption key file 30 is a file including device encryption key data, which is used for decrypting data stored in the encryption storage 25, and a hash value (expected value) of the device encryption key data. The encryption key file 30 is encrypted using encryption key data. The decryption key data 32 for decrypting encryption key file is decryption key data used for decrypting the encryption key file 30. The decryption key data 32 for decrypting encryption key file is acquired from the security chip 26 that has succeeded in verifying the integrity and authenticity of the firmware when the system boots up.

The CPU 21 of the information processing apparatus 1 executes the boot-up application program 34 to function as a boot-up unit. The boot-up unit boots up files (e.g., firmware and software such as the validity verification application program 36 and the application programs 44) constituting the system. The CPU 21 of the information processing apparatus 1 executes the validity verification application program 36 to function as a validity verification unit. The validity verification unit verifies the integrity and authenticity of the firmware and the encryption key file 30 when the system boots up. The validity verification unit uses the security chip 26 to verify the integrity and authenticity of the firmware when the system boots up. The validity verification unit acquires the decryption key data 32 for decrypting encryption key file from the security chip 26 that has succeeded in verifying the integrity and authenticity of the firmware when the system boots up, and verifies the integrity and authenticity of the encryption key file 30 as described later.

The CPU 21 of the information processing apparatus 1 executes the decryption application program 38 to function as a decryption unit. For example, the decryption unit uses the decryption key data 32 for decrypting encryption key file to decrypt the encryption key file 30. For example, the decryption unit uses device encryption key data included in the encryption key file 30 to decrypt data stored in the encryption storage 25.

The CPU 21 of the information processing apparatus 1 executes the encryption key file writing application program 40 to function as an encryption key file writing unit. For example, the encryption key file writing unit is executed when the encrypted encryption key file 30 is written to the non-encryption storage 24. The encryption key file writing unit writes the encryption key file 30 to the non-encryption storage 24. The encryption key file 30 is a file including an encrypted collection of the device encryption key data used for decrypting the data stored in the encryption storage 25 and the hash value (expected value) of the device encryption key data.

The CPU 21 of the information processing apparatus 1 executes the notification application program 42 to function as a notification unit. The notification unit notifies a verification result when the validity verification application program 36 fails a verification of the integrity and the authenticity. For example, when the validity verification application program 36 fails the verification of the integrity and the authenticity of the encryption key file 30, the notification unit displays the verification result on, for example, the operation device 3 to notify the user of an error. The application program 44 is an example of an application program that uses data stored in the encryption storage 25. The application program 44 is booted up by the boot-up unit.

The information processing apparatus 1 uses, for example, a trusted boot to perform tampering detection on firmware (e.g., basic input output system (BIOS), unified extensible firmware interface (UEFI) or a boot loader) when the system boots up.

For example, in the information processing apparatus 1 of FIG. 2, the boot-up unit, the validity verification unit, the decryption unit, the encryption key file writing unit, the notification unit, and the OS 50 are implemented by the CPU 21 illustrated in FIG. 1, which executes processing according to a program deployed in the RAM 23 as a work area. In the following description, the validity verification unit, the decryption unit, the encryption key file writing unit, and the notification unit may be referred to as the validity verification application program 36, the decryption application program 38, the encryption key file writing application program 40, and the notification application program 42, respectively, for the sake of convenience.

Figure 3:
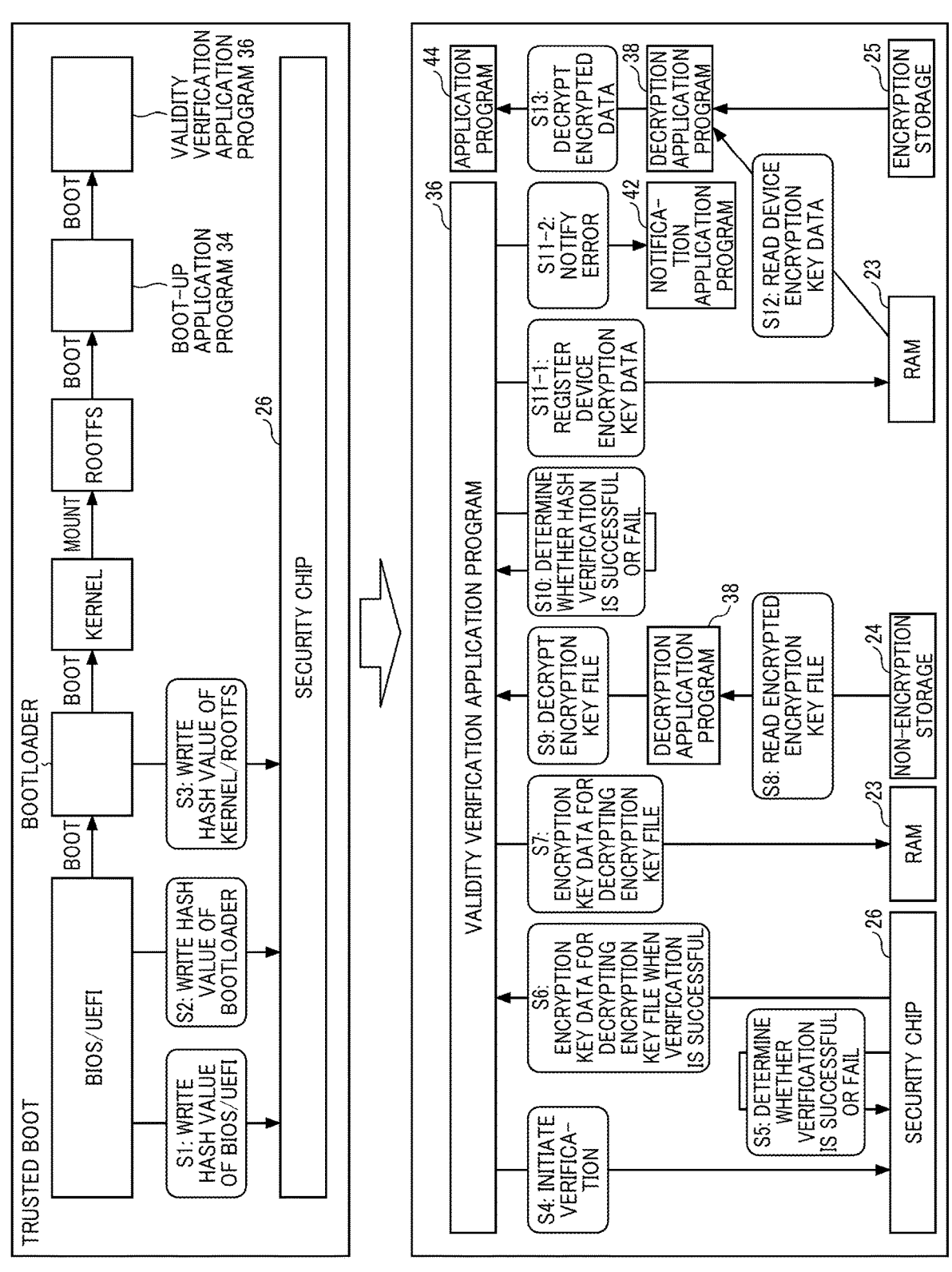
FIG. 3 is a diagram illustrating a processing image of verifying the integrity and authenticity of device encryption key data, according to an embodiment of the present disclosure.

A description is given below of processes or operation according to one or more embodiments. FIG. 3 is a diagram illustrating operation of verifying the integrity and authenticity of the device encryption key data, performed by the CPU 21, according to an embodiment of the present disclosure.

In steps S1 to S3, hash values measured from firmware such as BIOS/UEFI, a boot loader, a kernel, and a root filesystem (rootfs), which are used when the system boots up, are written into the security chip 26.

In steps S4 to S5, the security chip 26 verifies whether the hash values measured in steps S1 to S3 match the expected values of the hash values registered in advance, respectively. When the expected values of the hash value registered in advance and the hash values measured in steps S1 to S3 match respectively, the security chip 26 determines that the verification is successful. When the expected values of the hash value registered in advance and the hash values measured in steps S1 to 3 do not match, the security chip 26 determines that the verification fails.

When the verification is successful, the security chip 26 provides the decryption key data 32 for decrypting encryption key file to the validity verification application program 36 in step S6. In step S7, the validity verification application program 36 writes the decryption key data 32 for decrypting encryption key file provided in step S6 to the RAM 23.

In step S8, the decryption application program 38 reads the encrypted encryption key file 30 from the non-encryption storage 24. In step S9, the decryption application program 38 uses the decryption key data 32 for decrypting encryption key file written in the RAM 23 in step S7 to decrypt the encrypted encryption key file 30 read in step S8.

In step S10, the validity verification application program 36 measures the hash value of the device encryption key data included in the decrypted encryption key file. Subsequently, the validity verification application program 36 verifies whether the measured hash value of the device encryption key data matches the expected value of the hash value included in the encryption key file decrypted in step S9.

When the measured hash value of the device encryption key data matches the expected value of the hash value included in the encryption key file decrypted in step S9, the security chip 26 determines that the verification is successful. When the measured hash value of the device encryption key data does not match the expected value of the hash value included in the encryption key file decrypted in step S9, the security chip 26 determines that the verification fails.

When the verification is successful, the validity verification application program 36 writes the device encryption key data included in the decrypted encryption key file into the RAM 23 in step S11-1. When the verification fails, the notification application program 42 displays the verification result on, for example, the operation device 3 in step S11-2 to notify the user of an error.

In step S12, the decryption application program 38 reads the device encryption key data from RAM 23. In step S13, the decryption application program 38 decrypts encrypted data stored in the encryption storage 25 using the device encryption key data read from the RAM 23 in step S12.

As illustrated in FIG. 3, the information processing apparatus 1 according to the present embodiment can verify the integrity and authenticity of the device encryption key data stored in the non-encryption storage 24 and can detect tampering with the device encryption key data.

Figure 4:
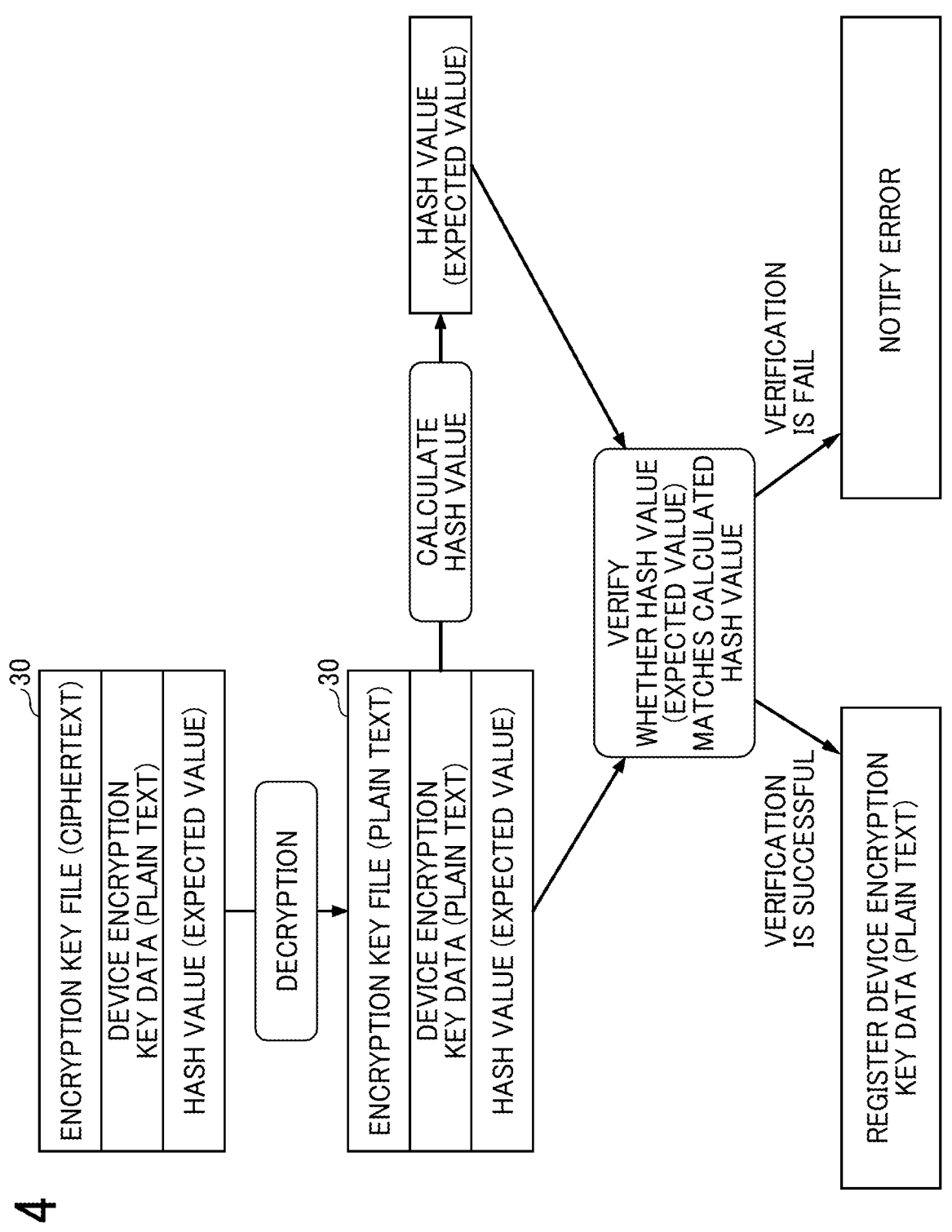
FIG. 4 is a diagram illustrating a processing image of verification using a hash value, according to an embodiment of the present disclosure.

The processing of step S10, step S11-1, and step S11-2 are performed as illustrated in FIG. 4, for example. FIG. 4 is a diagram illustrating a processing image of verification using the hash value, according to an embodiment of the present disclosure.

As illustrated in FIG. 4, the encryption key file 30 includes device encryption key data (plain text) and a hash value (expected value) of the device encryption key data (plain text). The encrypted encryption key file 30 read from the non-encryption storage 24 is described as an encryption key file (ciphertext) in FIG. 4. The encryption key file 30 decrypted by using the decryption key data 32 for decrypting encryption key file is described as an encryption key file (plain text) in FIG. 4. The device encryption key data (plain text) is referred to simply as device encryption key data.

The validity verification application program 36 calculates the hash value of the device encryption key data included in the encryption key file (plain text). In FIG. 4, the hash value calculated from the device encryption key data included in the encryption key file (plain text) is described as a hash value (at the time of boot-up). The hash value can be calculated by a hash function using, for example, a hash algorithm of secure hash algorithm 256 (SHA-256).

The validity verification application program 36 verifies whether the hash value (expected value) included in the encryption key file (plain text) matches the calculated hash value (at the time of boot-up) of the device encryption key data. When the hash value (expected value) included in the encryption key file (plain text) matches the calculated hash value (at the time of boot-up) of the device encryption key data, the validity verification application program 36 can detect that the device encryption key data has not been tampered, and thus the validity verification application program 36 determines that the verification is successful. When the verification is successful, the validity verification application program 36 writes the device encryption key data included in the encryption key file (plain text) into the RAM 23.

When the hash value (expected value) included in the encryption key file (plain text) does not match the calculated hash value (at the time of boot-up) of the device encryption key data, the validity verification application program 36 can detect that the device encryption key data has been tampered, and thus the validity verification application program 36 determines that the verification fails. When the verification fails, the notification application program 42 displays the verification result on, for example, the operation device 3 to notify the user of the error.

As illustrated in FIG. 4, the information processing apparatus 1 according to the present embodiment includes the hash value (expected value) of the device encryption key data in the encryption key file (ciphertext) to be decrypted using the decryption key data 32 for decrypting encryption key file to prevent tampering with the hash value (expected value).

FIG. 5 is a flowchart of a process of the encryption key file writing application program 40, according to an embodiment of the present disclosure. In step S50, the encryption key file writing application program 40 acquires the device encryption key data from the non-encryption storage 24.

In step S52, the encryption key file writing application program 40 measures the hash value of the device encryption key data acquired in step S50. In step S54, the encryption key file writing application program 40 generates the encryption key file 30 including the device encryption key data acquired in step S50 and the hash value (expected value) measured in step S52, and encrypts the encryption key file 30. In step S56, the encryption key file writing application program 40 writes the encryption key file 30 encrypted in step S54 into the non-encryption storage 24.

FIG. 6 is a flowchart of a process of the decryption application program 38 for decrypting the encryption key file, according to an embodiment of the present disclosure. In step S60, the decryption application program 38 acquires the encrypted encryption key file from the non-encryption storage 24. In step S62, the decryption application program 38 uses the decryption key data 32 for decrypting encryption key file read from the RAM 23 to decrypt the encryption key file.

Figure 7:
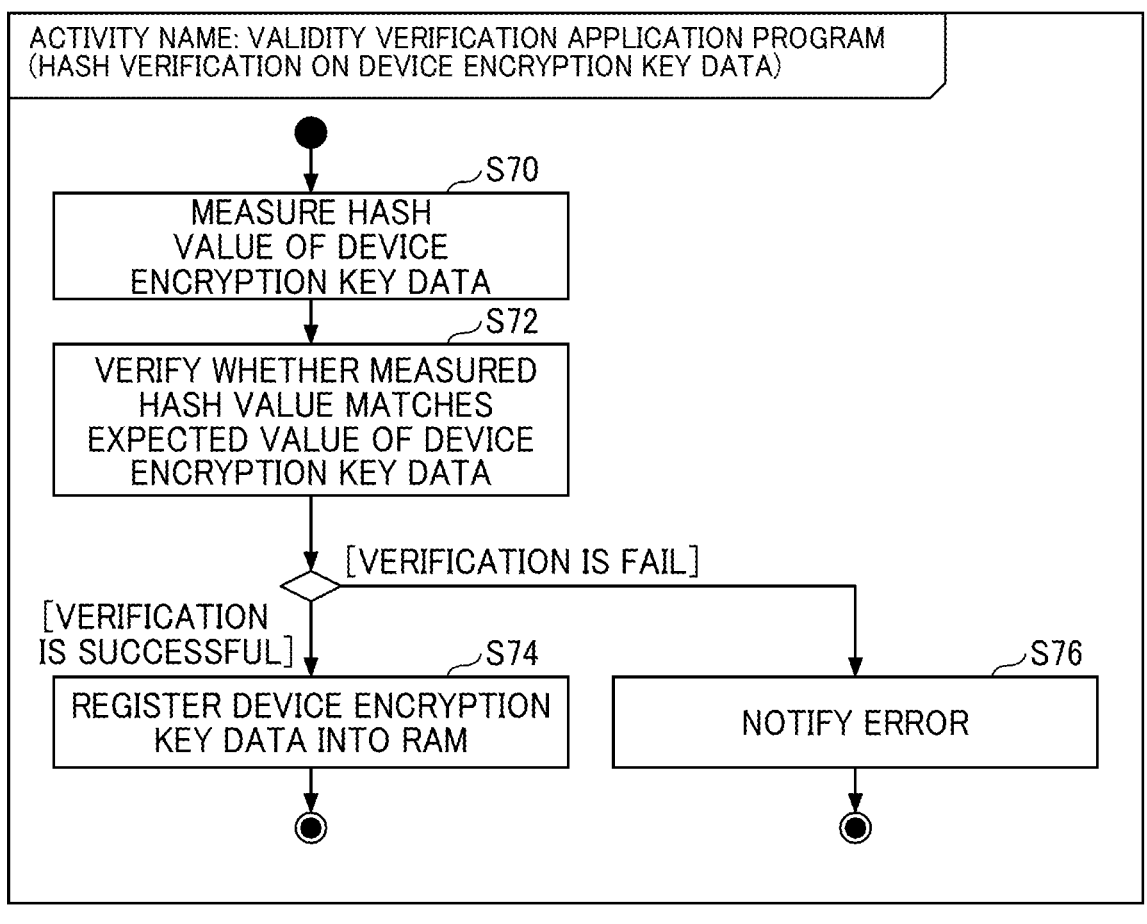
FIG. 7 is a flowchart of a process of a validity verification application program for performing hash verification of device encryption key data, according to an embodiment of the present disclosure.

FIG. 7 is a flowchart of a process of the validity verification application program 36 for performing hash verification of device encryption key data, according to an embodiment of the present disclosure. In step S70, the validity verification application program 36 measures the hash value (at the time of boot-up) of the device encryption key data included in the decrypted encryption key file 30.

In step S72, the validity verification application program 36 verifies whether the measured hash value (at the time of boot-up) matches the hash value (expected value) of the device encryption key data included in the decrypted encryption key file 30.

When the verification of the hash value is successful, the validity verification application program 36 writes the device encryption key data into the RAM 23 in step S74 to enable the decryption application program 38 to use the device encryption key data. When the verification of the hash value fails, the notification application program 42 displays the verification result on, for example, the operation device 3 in step S76 to notify the user of an error. The information processing apparatus 1 may stop the system after notifying the error.

As described above, the information processing apparatus 1 according to the present embodiment can detect tampering with the device encryption key data used for decryption of data in the encryption storage 25 when the system boots up.

In the above description, one encrypted encryption key file 30 is written into the non-encryption storage 24. However, multiple encrypted encryption key files 30 may be written in the non-encryption storage 24.

Figure 8:
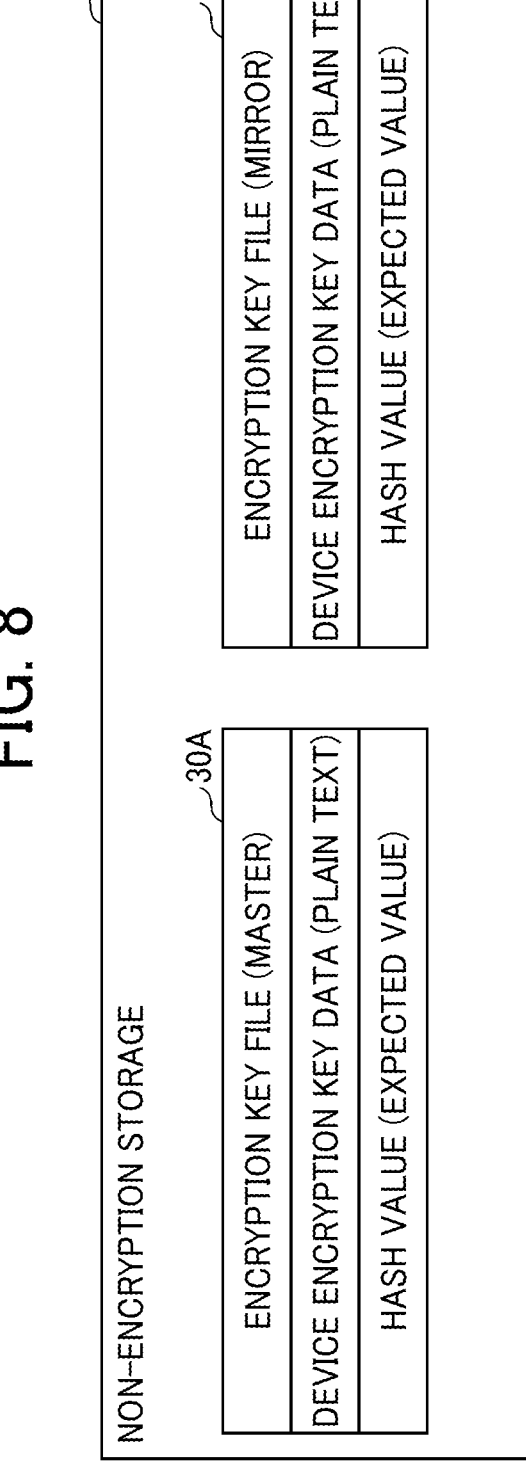
FIG. 8 is a diagram illustrating two encryption key files, written in a non-encryption storage, according to an embodiment of the present disclosure.

FIG. 8 is a diagram illustrating two encryption key files written in a non-encryption storage, according to an embodiment of the present disclosure. FIG. 8 illustrates an example in which an encrypted encryption key file (master) 30A and an encrypted encryption key file (mirror) 30B are written in the non-encryption storage 24. Note that the "master" and the "mirror" are examples of names for distinguishing encrypted key files, and may be called, for example, a "first" and a "second" respectively. The encrypted encryption key file (mirror) 30B may be duplicated from the encrypted encryption key file (master) 30A and may be written into the non-encryption storage 24.

One of the encrypted encryption key file (master) 30A and the encrypted encryption key file (mirror) 30B may be written in a storage other than the non-encryption storage 24. The encrypted encryption key file (master) 30A and the encrypted encryption key file (mirror) 30B may be written in the same storage or different storages.

As illustrated in FIG. 8, since the encrypted encryption key file (master) 30A and the encrypted encryption key file (mirror) 30B are written in the non-encryption storage 24, even if one of encryption key files 30 (master or mirror) is tampered with, the other encryption key file 30 that is not tampered with can be used to recover the tampered encryption key file.

Figure 9:
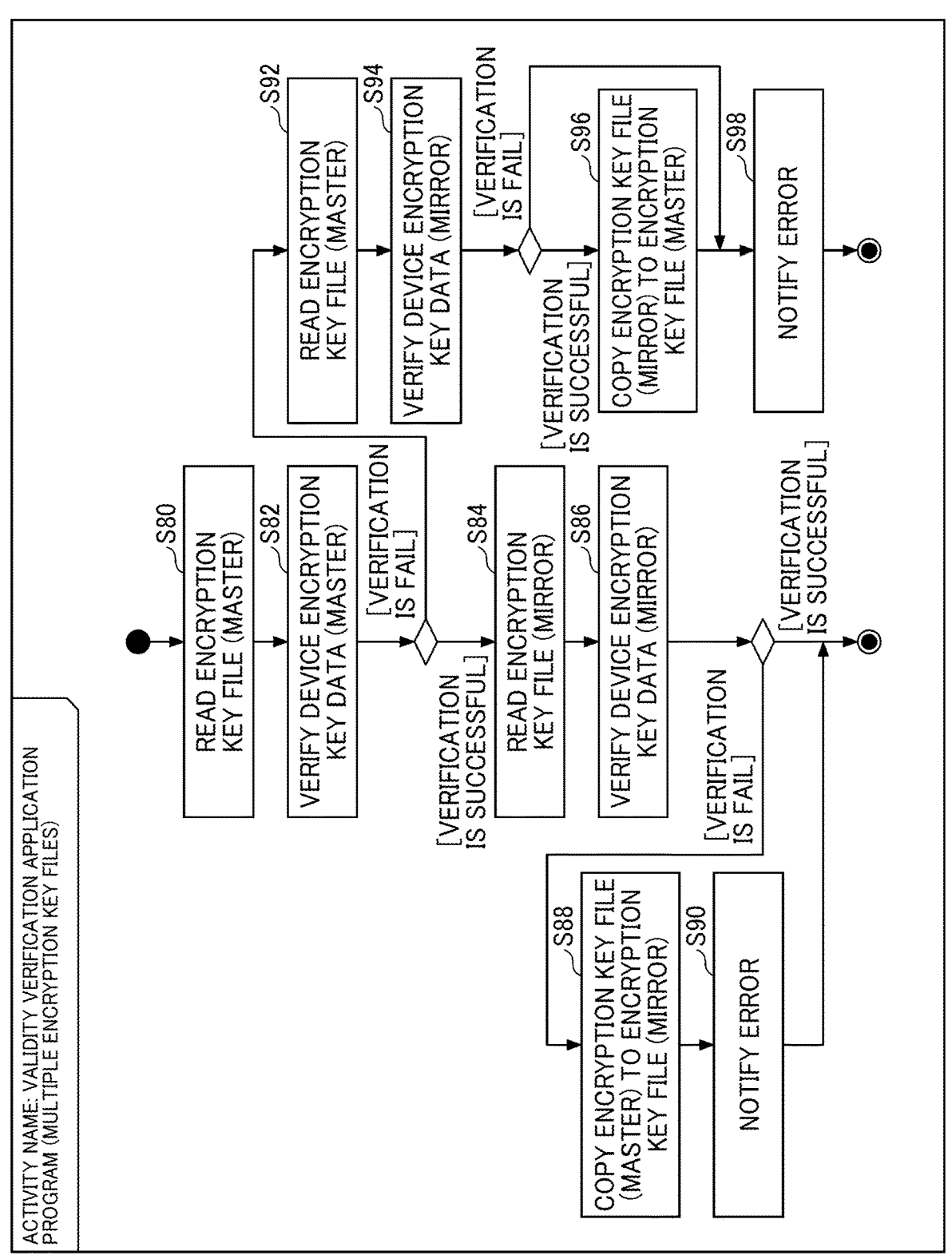
FIG. 9 is a diagram of a process of a validity verification application program in a case where multiple encryption key files are used, according to an embodiment of the present disclosure.

FIG. 9 is a diagram of a process of the validity verification application program 36 in a case where multiple encryption key files are used, according to an embodiment of the present disclosure. In step S80, the decryption application program 38 reads the encrypted encryption key file (master) 30A from the non-encryption storage 24. The decryption application program 38 uses the decryption key data 32 for decrypting encryption key file written in the RAM 23 to decrypt the encrypted encryption key file (master) 30A.

In step S82, the validity verification application program 36 measures the hash value of the device encryption key data included in the decrypted encryption key file (master) 30A. The validity verification application program 36 verifies whether the measured hash value of the device encryption key data matches the expected value of the hash value included in the encryption key file (master) 30A decrypted in step S80.

When the measured hash value of the device encryption key data matches the expected value of the hash value included in the decrypted encryption key file (master) 30A, the security chip 26 determines that the verification is successful. When the measured hash value of the device encryption key data does not match the expected value of the hash value included in the decrypted encryption key file (master) 30A, the security chip 26 determines that the verification fails.

When the verification is successful, the validity verification application program 36 writes the device encryption key data included in the decrypted encryption key file (master) 30A into the RAM 23 and proceeds to step S84. When the verification fails, the validity verification application program 36 proceeds to step S92.

In step S84, the decryption application program 38 reads the encrypted encryption key file (mirror) 30B from the non-encryption storage 24. The decryption application program 38 uses the decryption key data 32 for decrypting encryption key file written in the RAM 23 to decrypt the encrypted encryption key file (mirror) 30B.

In step S86, the validity verification application program 36 measures the hash value of the device encryption key data included in the decrypted encryption key file (mirror) 30B. The validity verification application program 36 verifies whether the measured hash value of the device encryption key data matches the expected value of the hash value included in the encryption key file (mirror) 30B decrypted in step S84.

When the measured hash value of the device encryption key data matches the expected value of the hash value included in the decrypted encryption key file (mirror) 30B, the security chip 26 determines that the verification is successful. When the measured hash value of the device encryption key data does not match the expected value of the hash value included in the decrypted encryption key file (mirror) 30B, the security chip 26 determines that the verification fails.

When the verification is successful, the validity verification application program 36 ends the process of FIG. 9. When the verification fails, the validity verification application program 36 proceeds to step S88. In step S88, the validity verification application program 36 copies the encryption key file (master) 30A to the encryption key file (mirror) 30B. As a result, the validity verification application program 36 can recover the encryption key file (mirror) 30B the verification of which fails.

In step S90, the notification application program 42 displays the verification result on, for example, the operation device 3 to notify the user of the error. After the notification application program 42 notifies the error, the information processing apparatus 1 may stop or continue the boot-up of the system.

When the verification fails in step S82, the decryption application program 38 reads the encrypted encryption key file (mirror) 30B from the non-encryption storage 24 in step S92. The decryption application program 38 uses the decryption key data 32 for decrypting encryption key file written in the RAM 23 to decrypt the encrypted encryption key file (mirror) 30B.

In step S94, the validity verification application program 36 measures the hash value of the device encryption key data included in the decrypted encryption key file (mirror) 30B. The validity verification application program 36 verifies whether the measured hash value of the device encryption key data matches the expected value of the hash value included in the encryption key file (mirror) 30B decrypted in step S92.

When the measured hash value of the device encryption key data matches the expected value of the hash value included in the decrypted encryption key file (mirror) 30B, the security chip 26 determines that the verification is successful. When the measured hash value of the device encryption key data does not match the expected value of the hash value included in the decrypted encryption key file (mirror) 30B, the security chip 26 determines that the verification fails.

When the verification is successful, the validity verification application program 36 copies the encryption key file (mirror) 30B to the encryption key file (master) 30A. As a result, the validity verification application program 36 can recover the encryption key file (master) 30A the verification of which has failed. When the verification fails, the validity verification application program 36 displays the verification result on, for example, the operation device 3 to notify the user of the error. After the error is notified, since the verification of the encryption key file (master) 30A and the encryption key file (mirror) 30B has failed, the information processing apparatus 1 stops the system boot-up.

According to the process of FIG. 9, even if either one of the encryption key file (master) 30A or the encryption key file (mirror) 30B is tampered with, the encryption key file (master) 30A or the encryption key file (mirror) 30B, which has been successfully verified for integrity and authenticity, can be used to recover the encryption key file (master) 30A or the encryption key file (mirror) 30B.

Other Embodiment

An information processing apparatus 1 according to an embodiment of the present disclosure is not limited to the configuration illustrated in FIG. 1 as long as the information processing apparatus 1 is an apparatus having a function of verifying the integrity and authenticity of a file when the system boots up. The information processing apparatus 1 may 1 may be an embedded device.

The information processing apparatus 1 may be, but not limited to, a device such as a projector (PJ), an interactive whiteboard (IWB; an electronic whiteboard having mutual communication capability), digital signage, a head-up display (HUD), an industrial machine, an imaging device, a sound collecting device, a medical device, a networked home appliance, an automobile (connected car), a laptop computer (PC), a mobile phone, a smartphone, a tablet terminal, a game console, a personal digital assistant (PDA), a digital camera, a wearable PC and a desktop PC.

Figure 10:
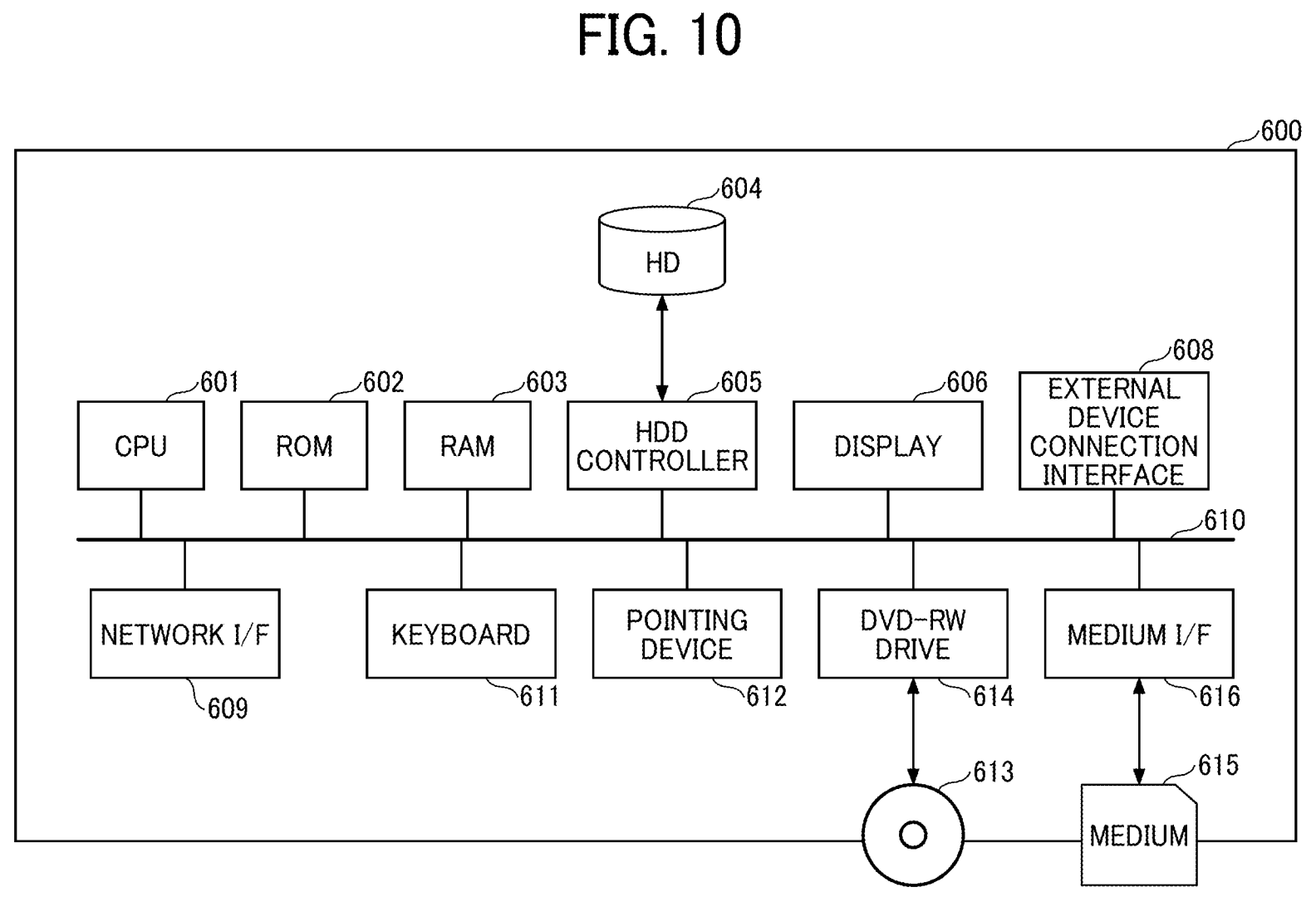
Figure 11:
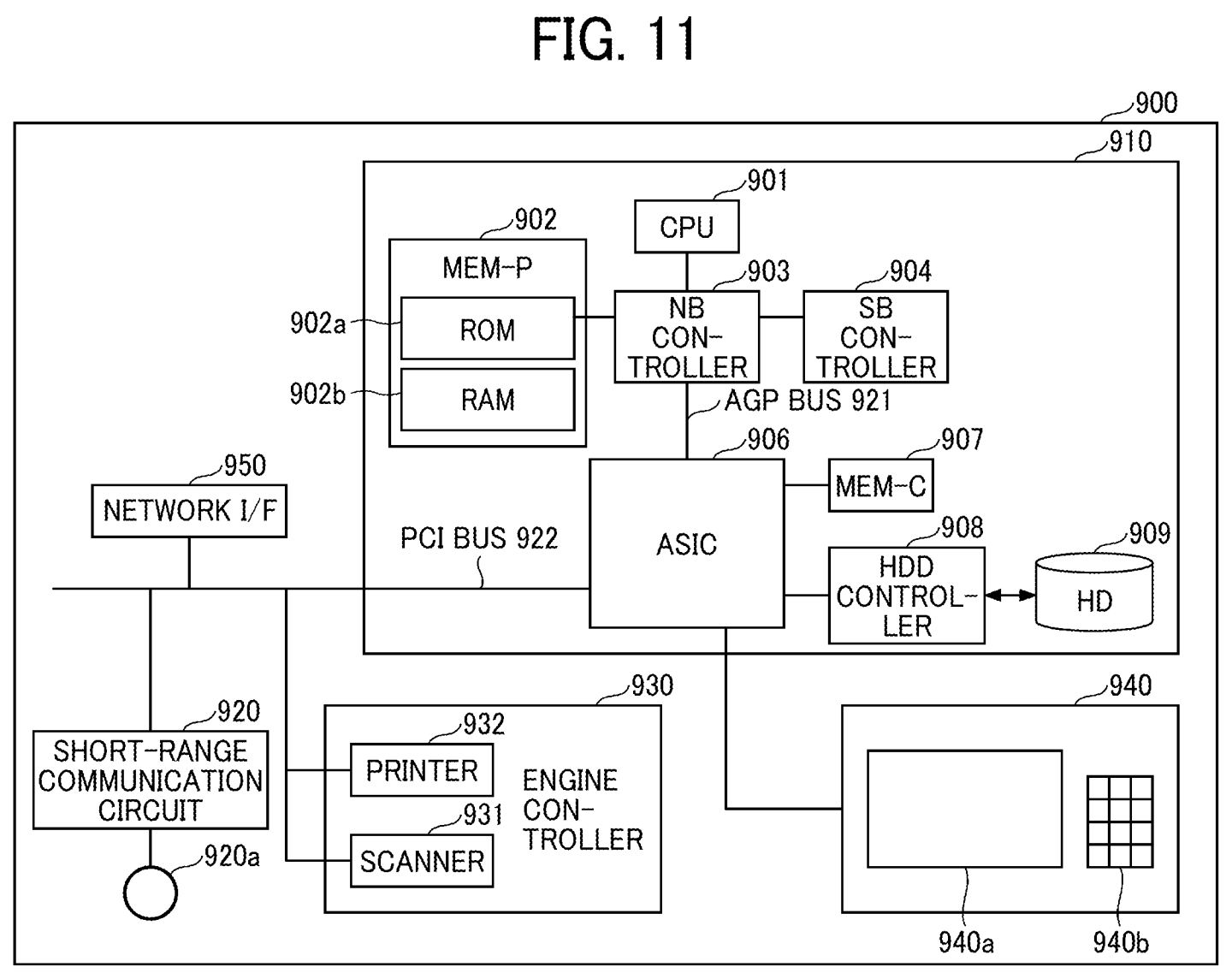

For example, an information processing apparatus 1 according to an embodiment of the present disclosure may be any one of a personal computer (PC) 600 having a hardware configuration illustrated in FIG. 10 and a multi-functional peripheral, product, or printer (MFP) 900 having a hardware configuration illustrated in FIG. 11.

FIG. 10 is a block diagram illustrating the hardware configuration of the PC 600 according to an embodiment of the present disclosure. As illustrated in FIG. 10, the PC 600 is implemented by a computer. The PC 600 includes a CPU 601, a ROM 602, a RAM 603, a hard disk (HD) 604, an HDD controller 605, a display 606, an external device connection interface (I/F) 608, a network I/F 609, a data bus 610, a keyboard 611, a pointing device 612, a digital versatile disc rewritable (DVD-RW) drive 614, and a medium I/F 616.

The CPU 601 controls overall operations of the PC 600. The ROM 602 stores a program such as an initial program loader (IPL) used for driving the CPU 601. The RAM 603 is used as a work area for the CPU 601. The HD 604 stores various data such as programs. The HDD controller 605 reads and writes various data from and to the HD 604 under control of the CPU 601.

The display 606 displays various information such as a cursor, a menu, a window, a character, or an image. The external device connection I/F 608 is an interface that connects the PC 600 to various external devices. Examples of the external devices include, but not limited to, a universal serial bus (USB) memory and a printer. The network I/F 609 is an interface that controls communication of data with an external device through a communication network. Examples of the data bus 610 include, but are not limited to, an address bus and a data bus, that electrically connects the components, such as the CPU 601 of FIG. 10, with one another.

The keyboard 611 is an example of an input device provided with multiple keys that allow the user to input characters, numerals, or various instructions. The pointing device 612 is an example of an input device, and allows the user to select or execute a specific instruction, select a target for processing, or move a cursor being displayed. The DVD-RW drive 614 controls reading or writing of various data with respect to a DVD-RW medium 613, which is an example of a removable storage medium. The removable storage medium is not limited to the DVD-RW and may be a digital versatile disc-recordable (DVD-R), for example.

The medium I/F 616 controls reading or writing (storing) of data from or to a storage medium 615 such as a flash memory.

FIG. 11 is a block diagram illustrating the hardware configuration of the MFP 900, according to an embodiment of the present disclosure. As illustrated in FIG. 11, the MFP 900 includes a controller 910, a short-range communication circuit 920, an engine controller 930, a control panel 940, and a network I/F 950. The controller 910 includes a CPU 901 as a main processor of a computer, a system memory (MEM-P) 902, a north bridge (NB) 903, a south bridge (SB) 904, an application specific integrated circuit (ASIC) 906, a local memory (MEM-C) 907 as a storage area, a HDD controller 908, and a HD 909 as a storage area. The NB 903 and the ASIC 906 are connected via an accelerated graphics port (AGP) bus 921.

The CPU 901 is a controller that controls overall operations of the MFP 900. The NB 903 connects the CPU 901, with the MEM-P 902, the SB 904, and the AGP bus 921. The NB 903 includes a memory controller for controlling reading or writing of various data with respect to the MEM-P 902, a peripheral component interconnect (PCI) master, and an AGP target.

The MEM-P 902 includes a ROM 902*a* as a memory that stores programs and data for implementing various functions of the controller 910. The MEM-P 902 further includes a RAM 902*b* as a memory that deploys the programs and data, or as a drawing memory that stores drawing data for printing. The program stored in the RAM 902*b* may be stored in any computer-readable storage medium, such as a compact disc-read-only memory (CD-ROM), compact disc-recordable (CD-R), or digital versatile disc (DVD), in a file format installable or executable by the computer, for distribution. The SB 904 is a bridge that connects the NB 903 with a PCI device or a peripheral device. The ASIC 906 is an integrated circuit (IC) including hardware elements for image processing and dedicated to an image processing use. The ASIC 906 serves as a bridge to connect the AGP bus 921, a PCI bus 922, the HDD controller 908, and the MEM-C 907 each other.

The ASIC 906 includes a PCI target, an AGP master, an arbiter (ARB) as a central processor of the ASIC 906, a memory controller, multiple direct memory access controllers (DMACs), and a PCI unit. The memory controller controls the MEM-C 907. The DMACs convert coordinates of image data with a hardware logic. The PCI unit transfers data between a scanner controller 931 and a printer controller 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 is a storage that stores various image data, font data for printing, and form data. The HDD controller 908 reads or writes various data from or to the HD 909 under control of the CPU 901. The AGP bus 921 is a bus interface for a graphics accelerator card, which is proposed to accelerate graphics processing. Through directly accessing the MEM-P 902 by high-throughput, the speed of the graphics accelerator card is increased.

The short-range communication circuit 920 includes a short-range communication antenna 920*a*. The short-range communication circuit 920 is a communication circuit that communicates in compliance with the near field communication (NFC) or the Bluetooth®, for example.

The engine controller 930 includes the scanner controller 931 and the printer controller 932. The control panel 940 includes a panel display 940*a* and an operation panel 940*b*. The panel display 940*a* is, for example, a touch screen that displays current settings or a selection screen and that receives the user input. The operation panel 940*b* includes, for example, a numeric keypad and a start key. The numeric keypad receives set values of various image forming parameters such as an image density parameter. The start key receives an instruction to start copying. The controller 910 controls the overall operations of the MFP 900. For example, the controller 910 controls drawing, communication, or user inputs to the control panel 940. The scanner controller 931 or the printer controller 932 includes an image processing unit for performing various image processing, such as error diffusion or gamma conversion.

In response to an instruction to select a specific application through the control panel 940, the MFP 900 selectively performs a document box function, a copy function, a print function, and a facsimile function. In response to the selection of the document box function, the MFP 900 operates in a document box mode. In response to the selection of the copier function, the MFP 900 operates in a copier mode. In response to the selection of the printer function, the MFP 900 operates in printer mode. In response to the selection of the facsimile function, the MFP 900 operates in a facsimile mode.

The network I/F 950 controls communication of data with an external device through the communication network. The short-range communication circuit 920 and the network I/F 950 are electrically connected to the ASIC 906 through PCI bus 922.

The above-described embodiments are illustrative and do not limit the present disclosure. Thus, numerous additional modifications and variations are possible in light of the above teachings without deviating from the scope of the present disclosure. The information processing apparatus 1 described in the above embodiments is just an example, and there may be various system configurations depending on applications or purposes.

Each of the functions of the embodiments described above may be implemented by one or more processing circuits or circuitry. The "processing circuit or circuitry" in the present disclosure includes a programmed processor to execute functions by software, such as a processor implemented by an electronic circuit, and a device such as an application specific integrated circuit (ASIC) that is designed to execute the above functions, a digital signal processor (DSP), a field programmable gate array (FPGA), and circuit modules arranged to perform the recited functions.

The group of apparatuses or devices according to the embodiments described above are merely one example of multiple computing environments that implement the embodiments disclosed herein.

Aspects of the present disclosure are, for example, as follows.

Aspect 1

An information processing apparatus includes an encryption key file writing unit, a decryption unit, a validity verification unit, and a notification unit. The encryption key file writing unit writes an encryption key file that is encrypted into a second storage. The encryption key file includes first encryption key data and a first hash value of the first encryption key data. The first encryption key data is used for decrypting data stored in a first storage. The decryption unit uses a second encryption key data for decrypting the encryption key file to decrypt the encryption key file stored in the second storage. The validity verification unit calculates a second hash value of the first encryption key data included in the encryption key file that is decrypted and perform verification whether the first hash value matches the second hash value. The notification unit notifies a verification result when the verification fails.

Aspect 2

In the information processing apparatus according to Aspect 1, the second storage is a storage that is not encrypted. The second encryption key data is acquired from a security chip that has succeeded in verifying an integrity and an authenticity of a firmware when a system boots up.

Aspect 3

In the information processing apparatus according to Aspect 1 or Aspect 2, the encryption key file writing unit duplicates the encrypted encryption key file to multiple copies of the encrypted encryption key files and writes the multiple copies of the encrypted encryption key files into the second storage. The encryption key file writing unit recovers one encryption key file among the multiple copies of encrypted encryption key files written in the second storage, that has been failed in the verification using another encryption key file that has been succeeded in the verification.

Aspect 4

In the information processing apparatus according to Aspect 3, the notification unit notifies the verification result after the encryption key file writing unit recovers one encryption key file that has been failed in the verification using another encryption key file that has been succeeded in the verification.

Aspect 5

An information processing method is performed by a computer. The information processing method includes: writing an encryption key file that is encrypted into a second storage, the encryption key file including first encryption key data and a first hash value of the first encryption key data, the first encryption key data being used for decrypting data stored in a first storage; using a second encryption key data for decrypting the encryption key file to decrypt the encryption key file stored in the second storage; calculating a second hash value of the first encryption key data included in the encryption key file that is decrypted and perform verification whether the first hash value matches the second hash value; and notifying a verification result when the verification fails.

Aspect 6

A program is performed by an information processing apparatus. The program causes the information processing apparatus to execute a process. The process includes: writing an encryption key file that is encrypted into a second storage, the encryption key file including first encryption key data and a first hash value of the first encryption key data, the first encryption key data being used for decrypting data stored in a first storage; using a second encryption key data for decrypting the encryption key file to decrypt the encryption key file stored in the second storage; calculating a second hash value of the first encryption key data included in the encryption key file that is decrypted and perform verification whether the first hash value matches the second hash value; and notifying a verification result when the verification fails.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:

processing circuitry configured to:

write an encryption key file that is encrypted into a second storage, the encryption key file including first encryption key data and a first hash value of the first encryption key data, the first encryption key data being used for decrypting data stored in a first storage;

decrypt the encryption key file that is encrypted using a second encryption key data to obtain the encryption key file that is decrypted;

after obtaining the encryption key file that is decrypted, calculate a second hash value from the first encryption key data included in the encryption key file that is decrypted;

perform verification of the second encryption key data based on a determination of whether the first hash value matches the second hash value;

notify a verification result in response to determining that the verification fails; and decrypt the data stored in the first storage using the first encryption key data in response to determining that the verification succeeds.

2. The information processing apparatus according to claim 1, wherein the second storage is a storage that is not encrypted, and the second encryption key data is acquired from a security chip.

3. The information processing apparatus according to claim 2, wherein the processing circuitry is further configured to:

verify whether a hash value registered in the security chip matches a hash value that is calculated when a system boots up; and acquire the second encryption key data from the security chip when the verification with the security chip is successful.

4. The information processing apparatus according to claim 1, wherein the processing circuitry is configured to:

create and write a plurality of copies of the encryption key file that is encrypted into the second storage; and recover one encryption key file, of the plurality of encrypted encryption key files written in the second storage, that has failed in the verification, using another encryption key file that has succeeded in the verification.

5. The information processing apparatus according to claim 4, wherein the processing circuitry is configured to notify the verification result after the one encryption key file is recovered using the other encryption key file.

6. An information processing method, the method comprising:

writing an encryption key file that is encrypted into a second storage, the encryption key file including first encryption key data and a first hash value of the first encryption key data, the first encryption key data being used for decrypting data stored in a first storage;

decrypting the encryption key file that is encrypted using a second encryption key data to obtain the encryption key file that is decrypted;

after obtaining the encryption key file that is decrypted, calculating a second hash value from the first encryption key data included in the encryption key file that is decrypted;

performing verification of the second encryption key data based on a determination of whether the first hash value matches the second hash value;

notifying a verification result in response to determining that the verification fails; and decrypting the data stored in the first storage using the first encryption key data in response to determining that the verification succeeds.

7. A non-transitory, computer-readable storage medium storing computer-readable program code that causes an information processing apparatus to perform:

writing an encryption key file that is encrypted into a second storage, the encryption key file including first encryption key data and a first hash value of the first encryption key data, the first encryption key data being used for decrypting data stored in a first storage;

decrypting the encryption key file that is encrypted using a second encryption key data to obtain the encryption key file that is decrypted;

after obtaining the encryption key file that is decrypted, calculating a second hash value from the first encryption key data included in the encryption key file that is decrypted;

performing verification of the second encryption key data based on a determination of whether the first hash value matches the second hash value;

notifying a verification result in response to determining that the verification fails; and decrypting the data stored in the first storage using the first encryption key data in response to determining that the verification succeeds.

\* \* \* \* \*